(12) United States Patent
Cerochi et al.

(10) Patent No.: US 10,933,765 B2
(45) Date of Patent: Mar. 2, 2021

(54) STAND-ALONE MODULE THAT OPTIMIZES ENERGY CONSUMPTION WHILE MONITORING BOTH TEMPERATURES AND VOLTAGES

(71) Applicant: Phoenix Motorcars LLC, Ontario, CA (US)

(72) Inventors: Gustavo Cerochi, North Hills, CA (US); Will Hamada, Los Angeles, CA (US)

(73) Assignee: Phoenix Motorcars LLC, Ontario, CA (US)

( * ) Notice: Subject to any disclaimer, the term of this patent is extended or adjusted under 35 U.S.C. 154(b) by 0 days.

(21) Appl. No.: 15/731,695

(22) Filed: Jul. 18, 2017

(65) Prior Publication Data
US 2019/0023142 A1 Jan. 24, 2019

(51) Int. Cl.
| | |
|---|---|
| *H01M 10/46* | (2006.01) |
| *B60L 53/62* | (2019.01) |
| *B60L 11/18* | (2006.01) |
| *B60L 50/50* | (2019.01) |
| *B60L 3/12* | (2006.01) |
| *H02J 1/08* | (2006.01) |
| *H02J 7/14* | (2006.01) |
| *H02J 7/00* | (2006.01) |
| *H02J 9/00* | (2006.01) |

(52) U.S. Cl.
CPC ............ *B60L 53/62* (2019.02); *B60L 3/12* (2013.01); *B60L 11/1838* (2013.01); *B60L 50/50* (2019.02); *H02J 1/08* (2013.01); *H02J 7/007192* (2020.01); *H02J 7/1423* (2013.01); *B60L 2240/427* (2013.01); *B60L 2240/662* (2013.01); *H02J 1/082* (2020.01); *H02J 9/005* (2013.01)

(58) Field of Classification Search
CPC .... H02J 7/0042; H02J 7/355; H02J 7/007192; H02J 1/082; H02J 2310/48; H02J 7/1423; B60L 53/62; B60L 2240/662; B60L 2240/427; Y02T 90/12; Y02T 10/92; Y02T 90/16; Y02T 10/70
USPC ......................... 320/104, 107, 114, 115, 109
See application file for complete search history.

(56) References Cited

U.S. PATENT DOCUMENTS

| | | |
|---|---|---|
| 8,269,641 B2 | 9/2012 | Bauman et al. |
| 9,610,857 B2 | 4/2017 | Dai |
| 9,630,514 B2 | 4/2017 | Ferrel et al. |
| 2018/0105042 A1* | 4/2018 | Kuribara ................ H02S 40/38 |

* cited by examiner

*Primary Examiner* — Edward Tso
(74) *Attorney, Agent, or Firm* — Jeffrey A. McKinney; McKinney Law Group APC

(57) ABSTRACT

The present invention is generally directed to a Sleep Manager Module ("SLM"). In one case, the present invention provides a stand-alone Sleep Manager Module. The Sleep Manager Module is capable of optimizing electric vehicle power consumption based on external temperature. It has one or more interfaces that are electrically connected to a microcontroller. The microcontroller is operably connected to memory, and the one or more interfaces is selected from a group of interfaces consisting of a fast charge connector, a level II Electric Vehicle Supply Equipment, and temperature/battery voltage sensors. The microcontroller is connected to a Vehicle Integration Manager through a Wake-Up line and Vehicle Communication Line.

4 Claims, 2 Drawing Sheets

STAND-ALONE MODULE THAT OPTIMIZES ENERGY CONSUMPTION WHILE MONITORING BOTH TEMPERATURES AND VOLTAGES

FIELD OF THE INVENTION

The present invention is generally directed to a Sleep Manager Module ("SLM").

BACKGROUND OF THE INVENTION

There have been reports regarding modules that manage power in electronic devices and methods related to the modules. For instance, U.S. Pat. No. 9,630,514, entitled "System And Method For Vehicle Power Management" is allegedly directed to the following: "A power management system for a vehicle having wheels and an electric machine operable to provide torque to drive at least one of the wheels includes a first energy storage system capable of supplying power to operate the electric machine. The system also includes a second energy storage system capable of supplying power directly to at least one vehicle load at a lower voltage than the first energy storage system. A voltage conversion device is operable to reduce a voltage of the power supplied by the first energy storage system to the lower voltage to charge the second energy storage system when the vehicle is in a key-off state." Abstract.

U.S. Pat. No. 9,610,857, entitled "Power Management In Electric Vehicles" is allegedly directed to the following: "Various techniques described herein relate to electric vehicle power management system for managing a plurality of battery modules in a battery pack. Such electric vehicle power management system may include a plurality of battery management systems corresponding to a plurality of battery modules, and an energy management system for managing the plurality of battery management systems. The energy management system and the plurality of battery management systems may adopt master-slave wireless communication, and may use a single wireless frequency channel or a plurality of assigned wireless frequency channels." Abstract.

U.S. Pat. No. 8,269,641, entitled "Vehicle Power Management System" is allegedly directed to the following: "A vehicle power management system (VPMS) controls a charging voltage of a battery in a vehicle, wherein a VPMS controller evaluates state-of-charge (SOC), battery temperature, and battery charging current to determine a charge mode. A rapid charge mode is used when the SOC is less than a first threshold, wherein the VPMS controller selects a target rapid charge voltage, compensates the target rapid charge voltage for the battery temperature, and transmits the compensated rapid charge voltage to the charging source. A normal charge mode is used when the SOC is greater than the first threshold and less than a second threshold, wherein a target normal charge voltage is selected and compensated which is less than the target rapid charge voltage. A trickle charge mode is used when the SOC is greater than the second threshold, wherein a target trickle charge voltage is less than the target normal charge voltage. The VPMS controller also enters the trickle charge mode in the event of a failure to receive the SOC, battery temperature, or battery charging current from a battery monitor." Abstract.

Despite the various reports regarding modules that manage power in electronic devices and related methods, there is still a need for novel modules and related methods.

SUMMARY OF THE INVENTION

In one case, the present invention provides a stand-alone Sleep Manager Module that could optimize electric vehicle power consumption based on external temperature.

In another case, the present invention provides a stand-alone Sleep Manager Module that could optimize electric vehicle power consumption based on the low voltage battery power status.

In another case, the present invention provides a stand-alone Sleep Manager Module that could optimize utilization of Electric Vehicle chargers based on external temperature.

In another case, the present invention provides a stand-alone Sleep Manager Module that could optimize utilization of Electric Vehicle chargers based on the low voltage battery power status.

In another case, the present invention provides a business method. This business method involves selling the Sleep Manager Module as an independent unit to be used by any Electric Vehicle.

DETAILED DESCRIPTION OF THE INVENTION

Figure 1:
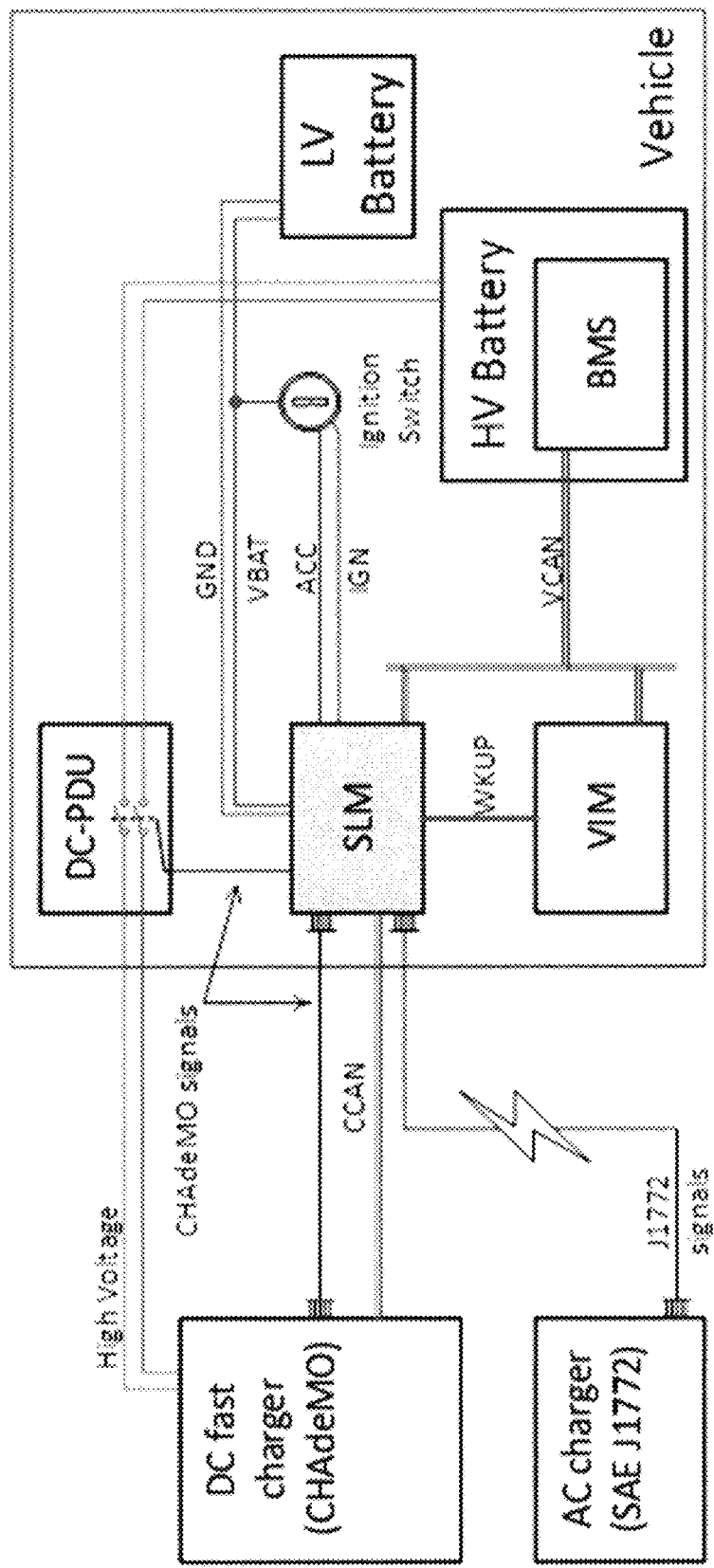
FIG. 1 shows an electronic system for an electric vehicle including a Sleep Manager Module according to the present invention.

"Battery Management System", or "BMS", refers to an electronic system that manages a rechargeable battery (cell or battery pack). Nonlimiting examples of management functions that a BMS can carry out include: protecting the battery from operating outside of its safe operating area; monitoring the battery's state; calculating secondary data for the battery and reporting it; controlling the battery's environment; authenticating the battery; and, balancing the battery.

"CHAdeMO" refers to a trade name of a quick charging method for battery electric vehicles delivering up to 62.5 kW of direct current (500 V, 125 A) via a special electrical connector.

"CCAN" refers to Charger Control Area Network".

"Controller Area Network", or "CAN", refers to a robust vehicle bus standard designed to allow microcontrollers and devices to communicate with each other in applications without a host computer.

"DC-PDU" refers to Direct Current-Power Distribution Unit. The Power Distribution Unit, or "PDU", provides safe distribution of high voltage electric vehicle and hybrid electric vehicle applications.

"HV Battery" refers to a high voltage battery.

"Ignition Switch", or "Starter Switch", refers to a switch in the control system of a vehicle that activates the low voltage electrical systems for the vehicle.

"Inverter" refers to an electronic device or circuitry that changes direct current ("DC") to alternating current ("AC").

"LV Battery" refers to a low voltage battery.

"SAE J1772" refers to a North American standard for electrical connectors for electric vehicles maintained by the SAE International and has the formal title "SAE Surface Vehicle Recommended Practice J1772, SAE Electric Vehicle Conductive Charge Coupler". It covers the general physical, electrical, communication protocol and performance requirements for the electric vehicle conductive charge system and coupler.

"Sleep Manager Module", or "SLM", refers to a module that optimizes energy consumption while monitoring both temperatures and voltages. The SLM is connected to the main Vehicle Control Area Network (VCAN) and to the dedicated Charger Control Area Network (CCAN), waking up the vehicle integration management unit (VIM) when certain conditions occur.

"Subsystem" refers to a self-contained system within a larger system.

"Vehicle" refers to a mobile machine that transports people or cargo. Typical vehicles include wagons, bicycles, motor vehicles (e.g., buses, cars, motorcycles, trucks), railed vehicles (trains, trams), watercraft (ships, boats), aircraft and spacecraft.

"VCAN" refers to Vehicle Control Area Network.

"VIM" refers to Vehicle Interface Module.

An electric vehicle's utilization can be optimized by ensuring that all subsystems are in a readiness state. To that effect, a variety of external and internal vehicle conditions can be monitored leading the Vehicle Control Module to take appropriate actions.

A Sleep Manager Module (SLM) optimizes energy consumption while monitoring both temperatures and voltages. The SLM is connected to the main Vehicle Control Area Network (VCAN) and to the dedicated Charger Control Area Network (CCAN), waking up the vehicle integration management unit (VIM) when certain conditions occur.

This independent controller activates electronic systems under certain conditions. The systems that can be activated include the battery heating and cooling module, the DC Power Distribution Unit and the Vehicle Interface module. The conditions triggering the activation include external temperatures, voltage setting or set schedule.

The SLM is a standalone electronics control device capable of communicating with the rest of the vehicle on the Controlled Area Network (CAN). The Module is powered with available vehicle DC voltage and provides interfaces for both ambient temperature sensor and vehicle low voltage measurement. The controller includes an ON/OFF scheduler which can be modified through calibration. Thresholds for both temperature and voltage controls can also be changed via calibration.

FIG. 1 shows an electronic system for an electric vehicle including a Sleep Manager Module according to the present invention. The DC Fast Charger is electrically connected to the Direct Current-Power Distribution Unit ("DC-PDU"), the Sleep Manager Module ("SLM") and the High Voltage Battery ("HV Battery"). J1772 signals are provided to the SLM by the AC Charger. In addition to the DC Fast Charger, the DC-PDU is electrically connected to the SLM, which is electrically connected to the Low Voltage Battery ("LV Battery"), the Battery Management System ("BMS") of the HV Battery and the Vehicle Interface Module ("VIM").

Figure 2:
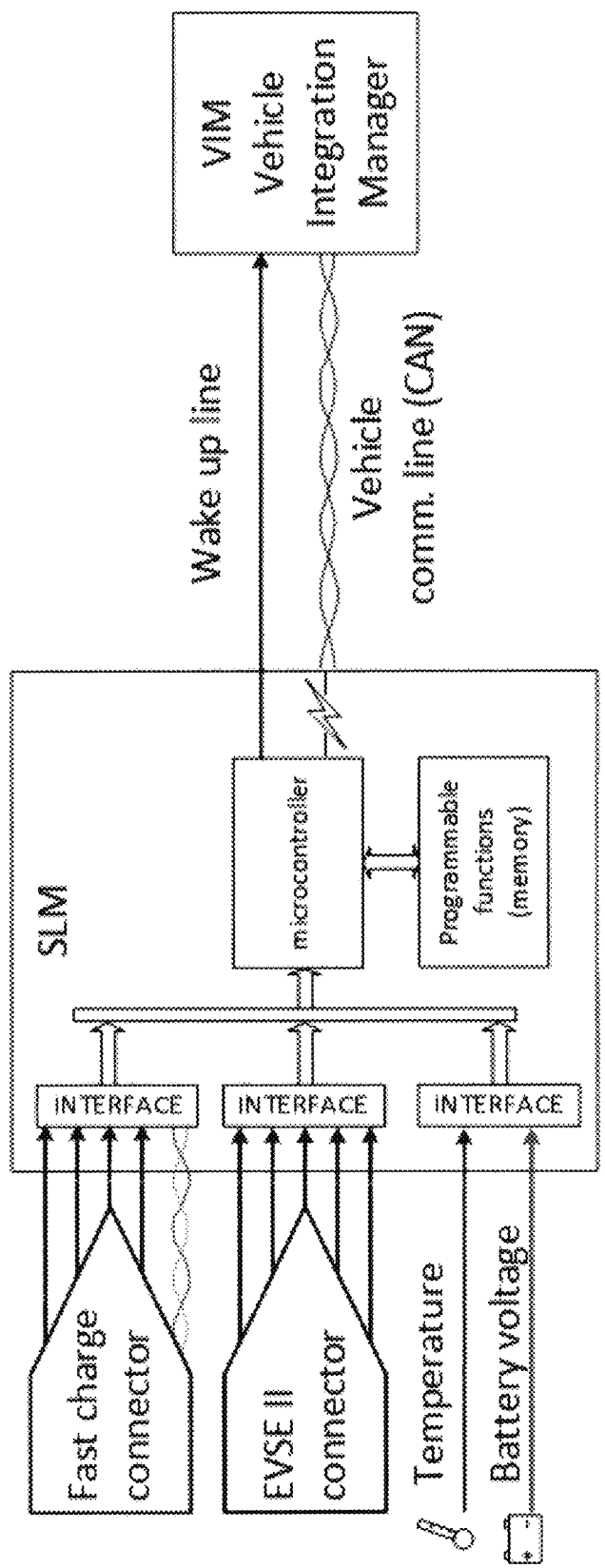
FIG. 2 shows a Sleep Manager Module according to the present invention.

FIG. 2 shows a Sleep Manager Module according to the present invention. As shown, the SLM has three interfaces that are electrically connected to a microcontroller. The microcontroller is operably connected to memory, which stores programmable functions. A fast charge connector is depicted as being electrically connected to the top SLM interface. The middle SLM interface is shown as being electrically connected to a level II Electric Vehicle Supply Equipment. Temperature and battery voltage sensors feed into the bottom SLM interface. A Wake-Up line and Vehicle Communication Line (CAN) connect the SLM's microcontroller to the Vehicle Integration Manager ("VIM").

In one case, the present invention provides a stand-alone Sleep Manager Module that could optimize electric vehicle power consumption based on external temperature. The SLM has one or more interfaces that are electrically connected to a microcontroller, which is operably connected to memory. The one or more interfaces provide electrical connection to one or more of the following elements: a fast charge connector; level II Electric Vehicle Supply Equipment; temperature/battery voltage sensors. Connection from the microcontroller to a Vehicle Integration Manager occurs through a Wake-Up line and Vehicle Communication Line.

In another case, the present invention provides a stand-alone Sleep Manager Module that could optimize electric vehicle power consumption based on the low voltage battery power status. The SLM has one or more interfaces that are electrically connected to a microcontroller, which is operably connected to memory. The one or more interfaces provide electrical connection to at least the following element: a battery voltage sensor. Connection from the microcontroller to a Vehicle Integration Manager occurs through a Wake-Up line and Vehicle Communication Line.

In another case, the present invention provides a stand-alone Sleep Manager Module that could optimize utilization of Electric Vehicle chargers based on external temperature. The SLM has one or more interfaces that are electrically connected to a microcontroller, which is operably connected to memory. The one or more interfaces provide electrical connection to at least the following element: a temperature sensor. Connection from the microcontroller to a Vehicle Integration Manager occurs through a Wake-Up line and Vehicle Communication Line.

In another case, the present invention provides a stand-alone Sleep Manager Module that could optimize utilization of Electric Vehicle chargers based on the low voltage battery power status. The SLM has one or more interfaces that are electrically connected to a microcontroller, which is operably connected to memory. The one or more interfaces provide electrical connection to at least the following element: a battery voltage sensor. Connection from the microcontroller to a Vehicle Integration Manager occurs through a Wake-Up line and Vehicle Communication Line.

In another case, the present invention provides a business method. This business method involves selling the Sleep Manager Module as an independent unit to be used by any Electric Vehicle. The SLM has one or more interfaces that are electrically connected to a microcontroller, which is operably connected to memory. The one or more interfaces provide electrical connection to one or more of the following elements: a fast charge connector; level II Electric Vehicle Supply Equipment; temperature/battery voltage sensors. Connection from the microcontroller to a Vehicle Integration Manager occurs through a Wake-Up line and Vehicle Communication Line.

The invention claimed is:

1. A module that optimizes energy consumption while monitoring both temperatures and voltages, wherein the module has three interfaces that are electrically connected to a microcontroller, and wherein the microcontroller is operably connected to memory that stores programmable functions, and one interface is electrically connected to a fast charge connector, and wherein a second interface is electrically connected a level II Electric Vehicle Supply Equipment, and wherein a third interface is connected to a temperature sensor and a battery voltage sensor, and wherein a vehicle control area network connects the microcontroller to a vehicle interface module.

2. The stand-alone module according to claim 1, wherein the module optimizes electric vehicle power consumption based on low voltage battery power status.

3. The stand-alone module according to claim 1, wherein the module optimizes utilization of electric vehicle chargers based on external temperature.

4. The stand-alone module according to claim 1, wherein the module optimizes utilization of electric vehicle chargers based on the low voltage battery power status.

* * * * *